US012576971B2

(12) United States Patent
Eisenhardt et al.

(10) Patent No.: US 12,576,971 B2
(45) Date of Patent: Mar. 17, 2026

(54) PASSENGER SUITE WITH SECONDARY SEAT AND AMENITIES

(71) Applicant: B/E Aerospace, Inc., Winston-Salem, NC (US)

(72) Inventors: Geoffrey Eisenhardt, Olathe, KS (US); Travis Vaninetti, Bothell, WA (US); Mauricio Santiago, Redmond, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/734,021

(22) Filed: Jun. 5, 2024

(65) Prior Publication Data

US 2024/0409217 A1     Dec. 12, 2024

Related U.S. Application Data

(60) Provisional application No. 63/471,415, filed on Jun. 6, 2023.

(51) Int. Cl.
*B64D 11/06* (2006.01)
*B64D 11/00* (2006.01)
(52) U.S. Cl.
CPC ...... *B64D 11/0604* (2014.12); *B64D 11/0638* (2014.12); *B64D 11/0641* (2014.12); *B64D 11/0015* (2013.01)
(58) Field of Classification Search
None
See application file for complete search history.

(56) References Cited

U.S. PATENT DOCUMENTS

| | | | |
|---|---|---|---|
| 3,142,461 A | 7/1964 | Leonard | |
| 3,381,921 A | 5/1968 | Mcdonough et al. | |
| 3,486,204 A | 12/1969 | Miller, Jr. et al. | |
| 3,578,274 A | 5/1971 | Ginn et al. | |
| 4,809,897 A | 3/1989 | Wright, Jr. | |

(Continued)

FOREIGN PATENT DOCUMENTS

| | | |
|---|---|---|
| EP | 2234884 B1 | 2/2012 |
| EP | 3620377 A1 | 3/2020 |
| FR | 3095190 A1 | 10/2020 |

OTHER PUBLICATIONS

European Search Report received in EP Application No. 24180569. 6, Feb. 14, 2025, 14 pages.

(Continued)

*Primary Examiner* — Joshua J Michener
*Assistant Examiner* — Cindi M Curry
(74) *Attorney, Agent, or Firm* — Suiter Swantz IP

(57) ABSTRACT

A passenger suite for business class in an aircraft includes a front wall, a back wall, a first side wall, and a second side wall defining an interior space. A primary seat is positioned in the interior space and against the back wall. A secondary seat is positioned in interior space and against the front wall. The secondary seat is movable between a first position against the front wall for use as an ottoman for the primary seat, and a second position apart from the front wall for use as a seat for a visiting passenger. A primary console is positioned against the back wall and a secondary console is positioned against the front wall. In embodiments, a suite entrance is positioned between the primary and secondary consoles.

14 Claims, 12 Drawing Sheets

(56)                References Cited

U.S. PATENT DOCUMENTS

| | | | |
|---|---|---|---|
| 4,936,620 | A | 6/1990 | Francois et al. |
| 6,059,364 | A | 5/2000 | Dryburgh et al. |
| 6,347,590 | B1 | 2/2002 | D'Annunzio et al. |
| 6,669,141 | B2 | 12/2003 | Schmidt-Schaeffer |
| 7,156,346 | B2 | 1/2007 | Mercier |
| 7,252,268 | B2 | 8/2007 | Saint-Jalmes |
| 7,367,528 | B2 | 5/2008 | Allison, Sr. |
| 7,568,759 | B2 | 8/2009 | Schurg |
| 7,578,470 | B2 | 8/2009 | Plant |
| 8,196,864 | B2 | 6/2012 | Ruiter et al. |
| 8,196,985 | B2 | 6/2012 | Penner et al. |
| 8,382,036 | B2 | 2/2013 | Ruiter et al. |
| 8,662,447 | B2 | 3/2014 | Johnson et al. |
| 8,807,481 | B2 | 8/2014 | Plant |
| 8,944,379 | B2 | 2/2015 | Orson et al. |
| 8,998,139 | B2 | 4/2015 | Dryburgh et al. |
| 9,169,020 | B2 | 10/2015 | Kroll et al. |
| 9,446,848 | B2 | 9/2016 | Jerome et al. |
| 9,550,573 | B2 | 1/2017 | Ersan et al. |
| 9,617,001 | B2 | 4/2017 | Zimmermann |
| 9,828,099 | B2 | 11/2017 | Henshaw et al. |
| 10,494,101 | B2 | 12/2019 | Wilson et al. |
| 10,632,933 | B2 | 4/2020 | Line et al. |
| 10,661,903 | B2 | 5/2020 | Dowty |
| 10,723,462 | B2 | 7/2020 | Ehlers et al. |
| 11,034,453 | B1 | 6/2021 | Malecha et al. |
| 11,066,170 | B2 | 7/2021 | Pozzi et al. |
| 11,147,384 | B1 | 10/2021 | Lopez Ramirez |
| 11,319,072 | B2 | 5/2022 | Henshaw et al. |
| 11,401,038 | B1 | 8/2022 | Warwick et al. |
| 11,465,749 | B1 | 10/2022 | Lawson |
| 11,597,522 | B2 | 3/2023 | Frost |
| 11,613,359 | B2 | 3/2023 | Dowty et al. |
| 2004/0195451 | A1 | 10/2004 | Bentley et al. |
| 2005/0151405 | A1 | 7/2005 | Dowty et al. |
| 2005/0268319 | A1 | 12/2005 | Brady, Jr. |
| 2006/0086864 | A1 | 4/2006 | Beroth |
| 2007/0034742 | A1 | 2/2007 | Jaeger et al. |
| 2007/0085389 | A1 | 4/2007 | Schurg |
| 2007/0246981 | A1 | 10/2007 | Plant |
| 2009/0146004 | A1 | 6/2009 | Plant |
| 2009/0302158 | A1* | 12/2009 | Darbyshire ........ B64D 11/0646 |
| | | | 244/118.6 |
| 2010/0065683 | A1 | 3/2010 | Darbyshire |
| 2010/0065684 | A1 | 3/2010 | Ruiter et al. |
| 2012/0112500 | A1 | 5/2012 | Rundle et al. |
| 2012/0146372 | A1 | 6/2012 | Ferry |
| 2012/0223186 | A1 | 9/2012 | Henshaw |
| 2012/0292957 | A1 | 11/2012 | Vergnaud et al. |
| 2013/0068887 | A1 | 3/2013 | Ko |
| 2013/0241246 | A1 | 9/2013 | Round et al. |
| 2013/0241247 | A1 | 9/2013 | Wallace et al. |
| 2013/0257121 | A1 | 10/2013 | Otta |
| 2014/0035330 | A1 | 2/2014 | Henshaw |
| 2014/0215534 | A1 | 7/2014 | Meckes et al. |
| 2014/0283296 | A1 | 9/2014 | Jerome et al. |
| 2014/0306500 | A1 | 10/2014 | Dryburgh et al. |
| 2015/0001341 | A1 | 1/2015 | Ersan et al. |
| 2015/0191111 | A1 | 7/2015 | Marini et al. |
| 2015/0274299 | A1 | 10/2015 | Henshaw et al. |
| 2015/0321592 | A1 | 11/2015 | De Morais |
| 2015/0367942 | A1 | 12/2015 | Parry et al. |
| 2016/0207468 | A1 | 7/2016 | Fesenmyer |
| 2016/0355109 | A1 | 12/2016 | Geraty |
| 2017/0015420 | A1 | 1/2017 | Henshaw et al. |
| 2017/0088267 | A1 | 3/2017 | Dowty et al. |
| 2017/0129611 | A1 | 5/2017 | Morgan |
| 2017/0233057 | A1 | 8/2017 | Charles et al. |
| 2017/0240283 | A1 | 8/2017 | Dowty |
| 2017/0259921 | A1 | 9/2017 | Valdes De La Garza et al. |
| 2017/0341754 | A1 | 11/2017 | Gross |
| 2018/0022458 | A1 | 1/2018 | Weifenbach |
| 2018/0029712 | A1 | 2/2018 | Sieben et al. |
| 2018/0029713 | A1 | 2/2018 | Weifenbach |
| 2018/0281964 | A1* | 10/2018 | Carlioz .............. B64D 11/0604 |
| 2018/0370635 | A1 | 12/2018 | Itzinger |
| 2019/0061955 | A1 | 2/2019 | Wilson et al. |
| 2019/0077512 | A1 | 3/2019 | Bentley et al. |
| 2019/0092475 | A1 | 3/2019 | Carlioz et al. |
| 2019/0193860 | A1 | 6/2019 | Ehlers et al. |
| 2019/0217957 | A1 | 7/2019 | Wilson et al. |
| 2019/0241269 | A1 | 8/2019 | Martin et al. |
| 2019/0276151 | A1 | 9/2019 | Dryburgh |
| 2019/0308731 | A1 | 10/2019 | Pozzi et al. |
| 2019/0315467 | A1* | 10/2019 | Nicholas ............ B64D 11/0602 |
| 2020/0055436 | A1 | 2/2020 | Garcia Sanchez et al. |
| 2020/0108934 | A1 | 4/2020 | Williamson et al. |
| 2020/0156794 | A1 | 5/2020 | Dowty et al. |
| 2020/0369389 | A1 | 11/2020 | Dowty et al. |
| 2020/0385125 | A1 | 12/2020 | Dowty |
| 2021/0269163 | A1* | 9/2021 | Woodington .......... B60N 2/206 |
| 2021/0371112 | A1 | 12/2021 | Wisniewski |
| 2022/0033083 | A1 | 2/2022 | Chareyre et al. |
| 2022/0106044 | A1* | 4/2022 | Pence ................ B64D 11/0606 |

OTHER PUBLICATIONS

European Patent Office, Extended European Search Report received in EP Application No. 24180556.3, Oct. 22, 2024, 6 pages.

* cited by examiner

PASSENGER SUITE WITH SECONDARY SEAT AND AMENITIES

CROSS-REFERENCE TO RELATED APPLICATION

This nonprovisional application claims the benefit of priority of U.S. Application No. 63/471,415 filed Jun. 6, 2023 for CONFIGURABLE MULTI-CLASS PASSENGER SEAT ASSEMBLY, which is hereby incorporated by reference in its entirety.

TECHNICAL FIELD AND BACKGROUND

The present disclosure relates generally to passenger suites for airliners and other conveyances, and more particularly, to a front row business class suite including amenities and visitor accommodations.

Conveyances such as airliners include different seating classes. Traditional economy classes maximize seating density at the expense of privacy and comfort, whereas traditional business classes maximize privacy and comfort at the expense of seating density. Business class offerings can vary greatly. In some implementations, business classes may include highly adjustable passenger seats positioned in an open cabin. In other implementations, businesses classes may include passenger seats positioned in individual passenger suites.

Traditional passenger suites include a single passenger seat capable of accommodating a single passenger, and various amenities positioned within the suite for use by the single passenger. Traditional amenity configurations are based on usage by the single passenger, and therefore do not consider use by a passenger and a visiting passenger.

Therefore, what is needed is a passenger suite capable of accommodating more than one passenger, as well as a passenger suite equipped with amenities for use by more than one passenger.

BRIEF SUMMARY

In one aspect, embodiments of the inventive concepts disclosed herein are directed to a passenger suite for business class in an aircraft. In embodiments, the passenger suite includes a front wall, a back wall, a first side wall, and a second side wall defining an interior space. A primary seat is positioned in the interior space against the back wall, facing the front wall, and alongside the first side wall. A secondary seat is positioned in the interior space against the front wall, alongside the first side wall, and facing the primary seat, the secondary seat includes a first support portion and a second support portion, and the secondary seat is movable between a first position against the front wall and a second position apart from the front wall. A primary console is positioned in the interior space against the back wall, alongside the primary seat, and alongside the second side wall. A secondary console is positioned in the interior space against the front wall and alongside the second side wall. In use, the secondary seat may be used as an ottoman serving the primary seat, or as a buddy seat for a passenger visiting the passenger suite.

In some embodiments, the passenger suite further includes an entrance positioned in the second side wall between the primary console and the secondary console.

In some embodiments, the passenger suite further includes an entrance positioned in the first side wall and alongside the primary seat.

In some embodiments, the first support portion of the secondary seat is a seat bottom, the second support portion of the secondary seat is a seat back, and the first support portion is elevated above a floor of the suite to provide a storage space under the first support portion.

In some embodiments, the primary seat includes a seat bottom, a seat back, and a leg rest, the primary seat is adjustable between an upright sitting position and a lay flat sleeping position, and when the primary seat is in the lay flat sleeping position, a forward end of the leg rest meets a forward end of the first support portion.

In some embodiments, a lateral portion of the secondary console extends along the front wall, a portion of the secondary seat is positioned under the lateral portion when the secondary seat is in the first position, and the secondary seat when in the second position deploys to a position out from under the lateral portion.

In some embodiments, the passenger suite further includes a meal table that stows within the secondary console, deploys to a position outside of the secondary console, travel along a guide rail, and deploys to first position over the secondary seat and a second position over at least a portion of the primary seat.

In some embodiments, the passenger suite further includes an armrest mounted to the first side wall, wherein the guide rail is mounted to an underside of the armrest.

In some embodiments, the passenger suite further includes a refrigerator mounted in the secondary console, wherein the refrigerator includes a swinging door that opens toward the second side wall.

According to another aspect, embodiments of the inventive concepts disclosed herein are directed to a front row passenger suite. In embodiments, the front row passenger suite includes a front wall, a back wall, a first side wall, and a second side wall defining an interior space. A primary seat is positioned in the interior space. A secondary seat is positioned forward of the primary seat and is movable between a first position in which the secondary seat functions as an ottoman for use with the first seat, and a second position in which the secondary seat functions as a seat for a visiting passenger. A primary console is positioned in the interior space for use with the primary seat. A secondary console is positioned in the interior space for use with the secondary seat when the secondary seat is in the second position.

In some embodiments, the passenger suite further includes a video monitor positioned above the secondary console.

In some embodiments, the interior space tapers in a direction of the forward end of the front row passenger suite.

According to a further aspect, embodiments of the inventive concepts disclosed herein are directed to a secondary seat for use in an aircraft passenger suite including a primary seat, a primary console positioned adjacent the primary seat, and a secondary console positioned forward of the primary seat. In embodiments, the secondary seat includes a seat bottom and a seat back, wherein the secondary seat is movable between a first position in which at least a portion of the secondary seat is positioned below the secondary console and the secondary seat is for use an ottoman for the primary seat, and a second position in which the secondary seat is positioned out from under the secondary console and the secondary seat is for use as a passenger seat.

In some embodiments, the secondary seat further includes an upstanding lateral portion continuous with the seat back.

In some embodiments, the seat bottom is positionable elevated above a floor to provide a storage space below the seat bottom.

This summary is provided solely as an introduction to subject matter that is fully described in the following detailed description and drawing figures. This summary should not be considered to describe essential features nor be used to determine the scope of the claims. Moreover, it is to be understood that both the foregoing summary and the following detailed description are explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
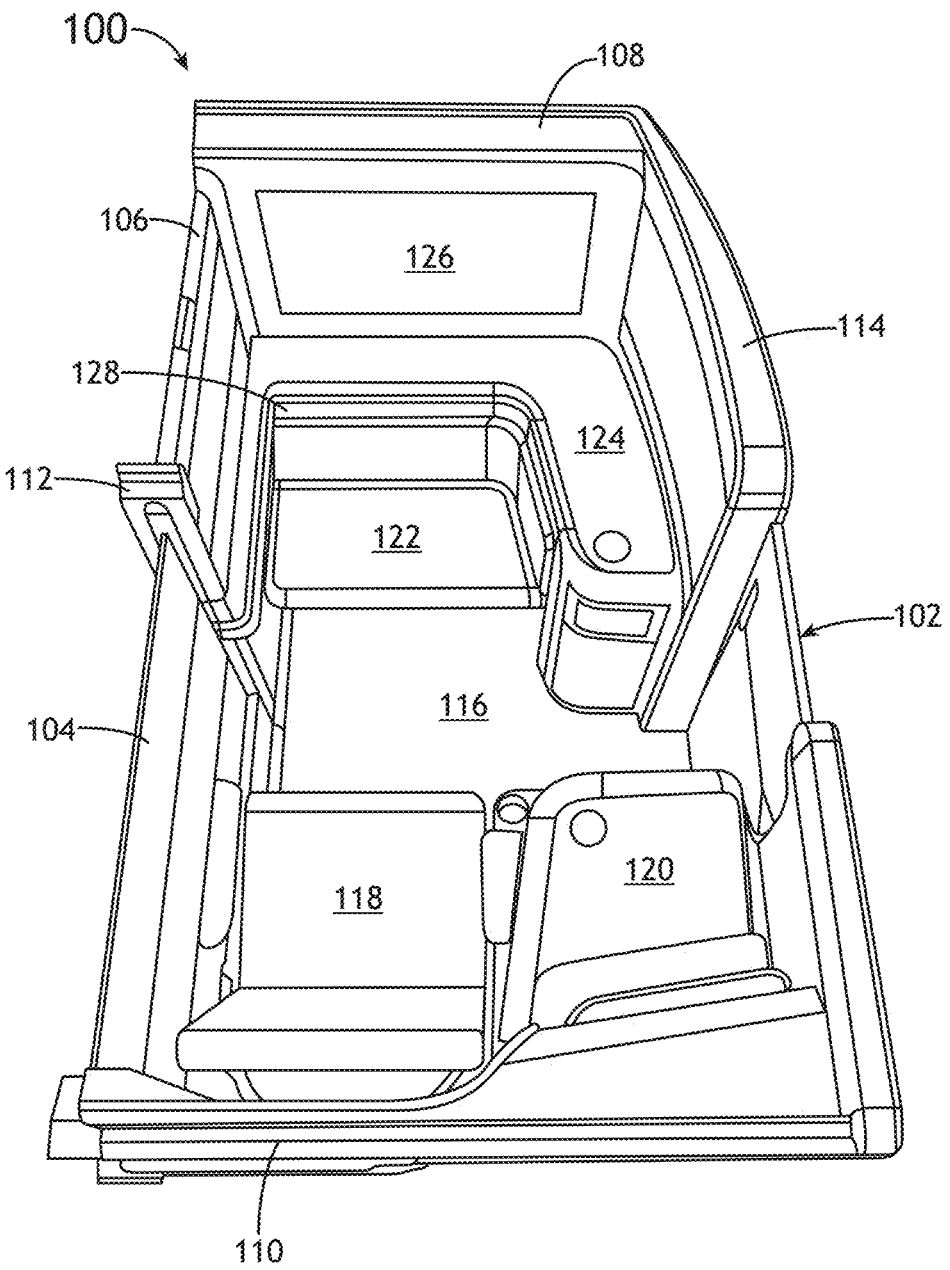
FIG. 1 is an overhead perspective view of a passenger suite including a primary seat and a secondary seat for a visiting passenger, in accordance with example embodiments of this disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1$a$, 1$b$). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to passenger suite including a primary seat and multi-use secondary seat. The primary seat is the main seat for use by the primary passenger during taxi, takeoff and landing (TTOL), and also during flight. The secondary seat when in a first position functions as an ottoman for use by the primary passenger when seated in the primary seat. The secondary seat when in the second position functions as a passenger seat for a secondary passenger, for instance a second passenger visiting the primary passenger when the aircraft is parked at the gate or during the flight phase. In embodiments, the secondary seat is a not a seat certified for TTOL, and thus during TTOL may be required to be positioned in the first position. In embodiments, the passenger suite may be a front row passenger suite having a tapering interior space particularly suited to be positioned at a tapering portion of the aircraft fuselage. The passenger suite further includes amenities for use by the primary passenger and further amenities for entertaining a secondary passenger visiting the passenger suite.

FIG. 1 illustrates a passenger suite 100 according to the present disclosure. The passenger suite 100 may be installed in an aircraft. In some embodiments, the passenger suite 100 may installed at the front of a seating class, for instance as a front row suite of a business or premium seating class. In some embodiments, the passenger suite 100 may be installed laterally adjacent to a longitudinal aircraft aisle providing direct access into the suite. As shown, the passenger suite 100 is configured as a starboard side suite considering the inward taper of the forward end as shown in the upper right-hand corner. In some embodiments, the passenger suite 100 may be positioned to the 'left' of a longitudinal aircraft aisle such that passengers enter the suite from an aisle through an entrance 102. In some embodiments, the passenger suite 100 may be positioned directly adjacent a like or similar suite positioned to the 'left' as shown in the drawing. Thus, like suites may be positioned as starboard and port side suites symmetrical about a longitudinal axis parallel to an aircraft longitudinal axis. In some embodiments, laterally adjacent suites may share a center wall to minimize complexity and weight. As shown, the passenger suite may include a first privacy divider 104 that may stow and deploy to relax or enhance privacy between adjacent suites, and a second privacy divider 106 that may perform in a similar manner at a different suite location.

The passenger suite 100 generally includes a front wall 108, a back wall 110, a first or inboard side wall 112, and a second or outboard side wall 114 defining an interior space 116. The designations of 'front', 'back', 'inboard' and 'outboard' assume the view shown with the front of the aircraft toward the top of the figure. Each wall 108, 110, 112, 114 may be made of one or more wall sections, and one or more of the walls may be connected. For example, the front wall 108 and a portion of the first second wall 114 may be integrally formed. Walls may extend from a floor of the suite upward to a predefined height, for instance to the ceiling or to a position below the ceiling, depending on the desired amount of privacy. As shown, the interior space 116 tapers inward toward the 'front' of the passenger suite, and the entrance 102 is positioned about midway along the second side wall 114.

A primary seat 118 is positioned in the interior space 116. As shown, the primary seat 118 is positioned against the back wall 110, facing the front wall 108, and alongside the first side wall 112 such that primary seat 118 is positioned in a corner of the suite 100 and apart from the entrance 102. A primary console 120 is positioned in the interior space 116 against the back wall 110, alongside the primary seat 118, and alongside the second side wall 114. The primary console 120 is positioned relative to the primary seat 118 for use in dining working, storage, etc. and is positioned to allow egress. In embodiments, the primary console 120 may include cupholders, a tabletop, storage, power and data ports, reading lights, literature pocket, seat controls, climate controls, and other amenities commensurate with a business of premium passenger suite.

A secondary seat 122 is positioned in the interior space 116, for instance against the front wall 108, alongside the first side wall 112, and facing the primary seat 118. In this positional relationship relative to the primary seat 118, the secondary seat has a multi-use functionality as described below. A secondary console 124 is positioned in the interior space 116, for instance against the front wall 108 and alongside the second side wall 114. The secondary console 124 as shown has a longitudinal extending portion and a laterally extending portion that are continuous. The secondary console 124 and the primary console 120 are spaced apart by the entrance 102. The primary console 120 is positioned for use by the primary seat 118 passenger and the secondary console 124 is positioned for use by a visiting passenger, although either console can be used by one or more passengers.

In some embodiments, a video monitor 126 is positioned above the secondary console 124, for instance directly forward of the primary passenger seat 118 for optimal viewing angle. In some embodiments, a meal table 128 stows within the secondary console 124 and deploys to a position outside of the secondary console 124 as described below. Overall, the floorplan of the passenger suite 100 is configured for use by a single passenger for maximum comfort and privacy, or to accommodate two passengers on a temporary basis wherein each passenger has a seat and access to a console. In either use condition, the one or more passengers has access to the entrance 102 for egress. In some uses, the privacy dividers 104, 106 may both be stowed at the same time to open the passenger suite 100 for conversation with one or more passengers in the adjacent suite.

Figure 2A:
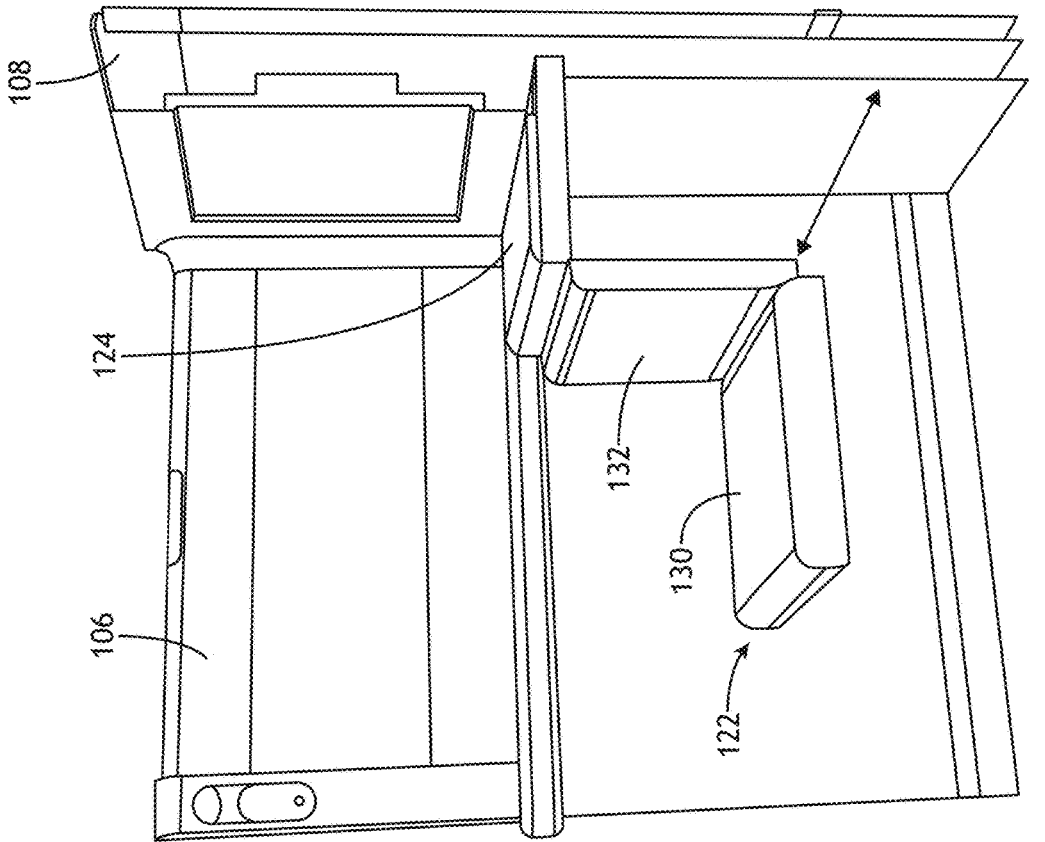
FIG. 2A is a side perspective view of a portion of the passenger suite showing the secondary seat in a second position for use as a passenger seat, in accordance with example embodiments of this disclosure.
Figure 2B:
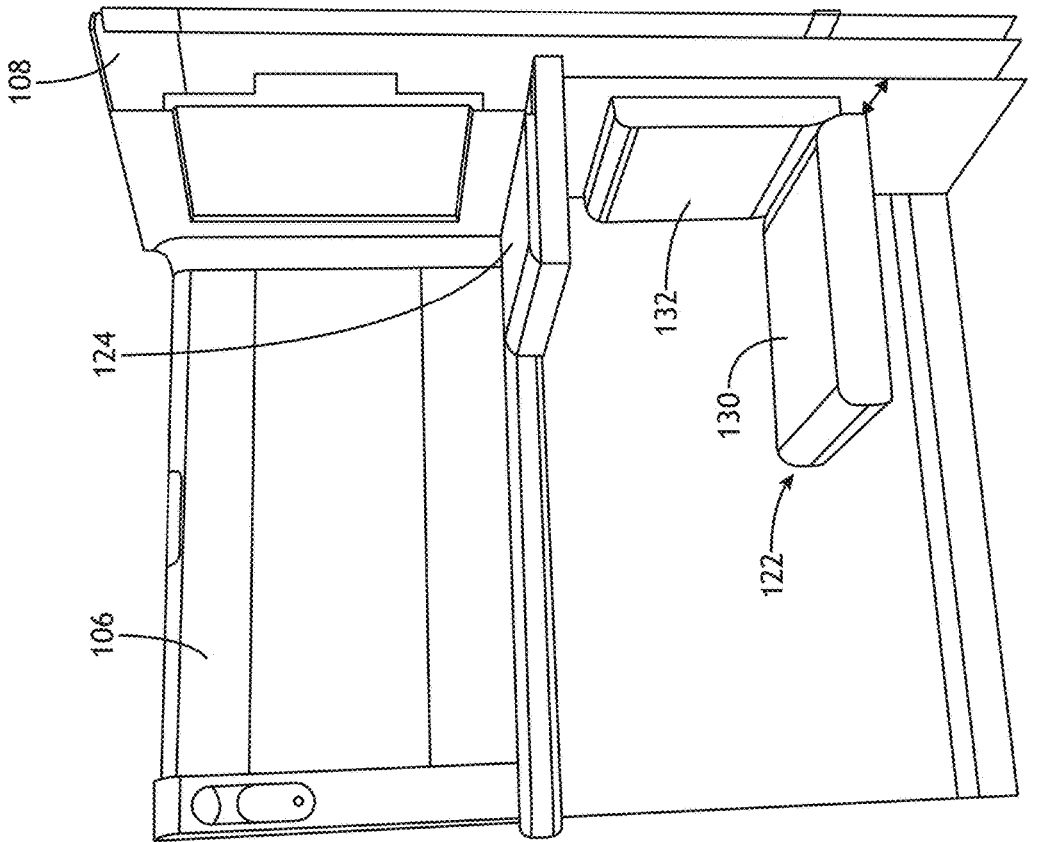
FIG. 2B is a side perspective view of a portion of the passenger suite showing the secondary seat in a first position for use as an ottoman, in accordance with example embodiments of this disclosure.

FIGS. 2A and 2B illustrate different uses of the secondary seat 122. In embodiments, the secondary seat 122 is movable between a first position as shown in FIG. 2B and a second position as shown in FIG. 2A, wherein the first position corresponds to use an ottoman for the primary seat, and the second position corresponds to use as a passenger seat for a secondary passenger, for instance a 'buddy' seat. As shown comparing FIGS. 2A and 2B, the motion between the first and second positions may include both a longitudinal displacement and a vertical displacement such that the secondary seat 122 translates and raises as the secondary seat 122 moves from the first position to the second position and translates and lowers as the secondary seat 122 moves from the second position to the first position. In some embodiments, the secondary seat 122 may translate longitudinally without vertical motion. When in the first position as shown in FIG. 2B, at least a portion of the secondary seat 122 is positioned under the secondary console 124 and against the front wall 108. When in the second position as shown in FIG. 2A, the secondary seat 122 is positioned out from under the secondary console 124 and apart from the front wall 108.

In some embodiments, the secondary seat 122 includes a first support portion or seat bottom 130, and a second support portion or seat back 132. The seat bottom 130 and the seat back 132 may be integrally form or separate to allow adjustability therebetween. FIGS. 2A and 2B further show the positional relationship of the secondary seat 122 relative to the second privacy divider 106, which is both figures is shown deployed for maximum privacy. The motion of the secondary seat 122 between the first and second positions may be achieved by traditional mechanisms, for instance one or more rails mounted to the suite walls for guiding motion of the slidably attached secondary seat 122. In a particular conceived example, one guide rail is mounted to the interior side of the first side wall 112 and another guide rail is mounted to the secondary console to guide the secondary seat motion.

Figure 3:
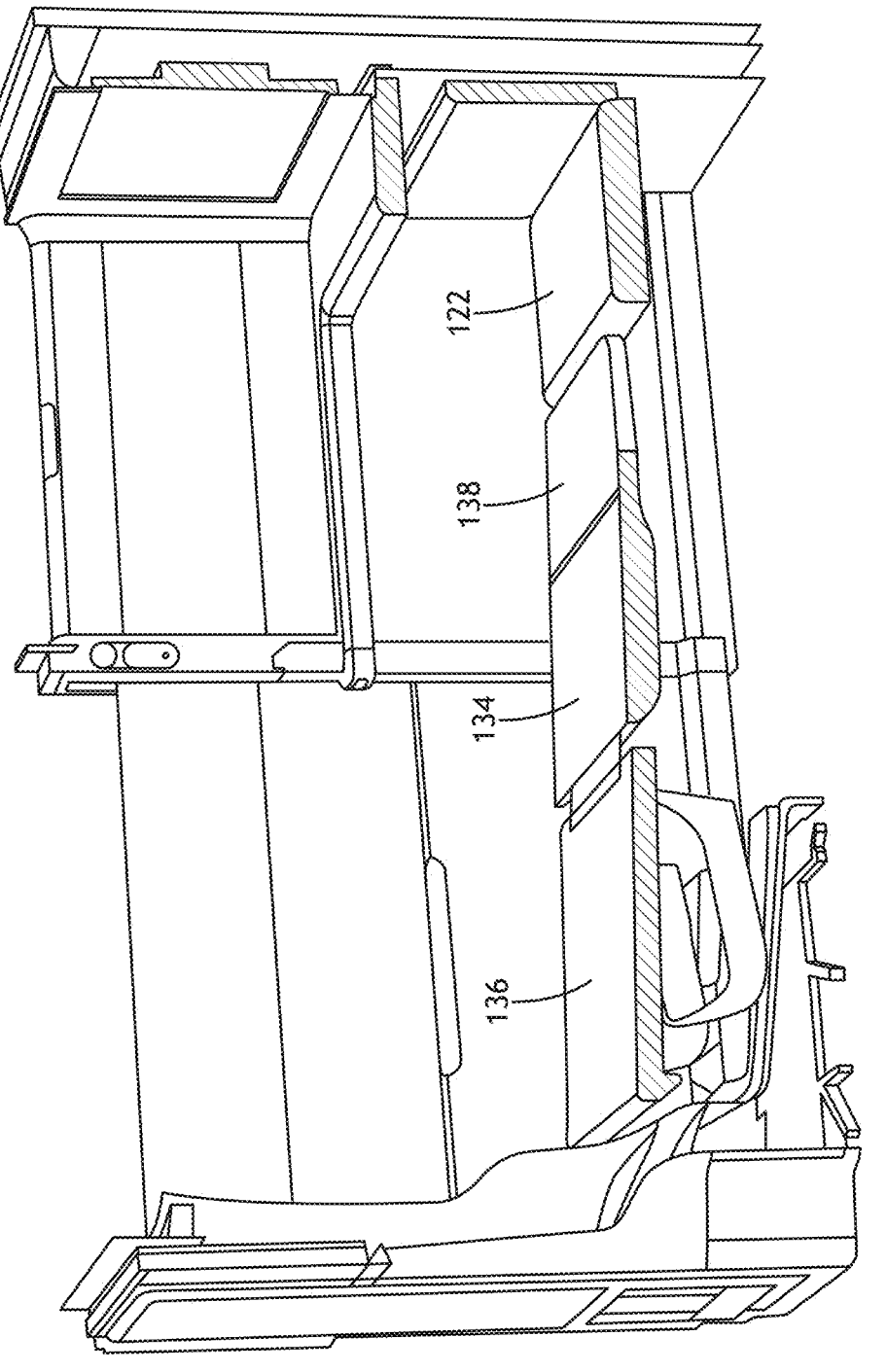
FIG. 3 is a side perspective view of the passenger suite showing the primary seat in a lay flat sleeping position meeting the ottoman, in accordance with example embodiments of this disclosure.

FIG. 3 illustrates the primary seat 118 adjusted to a lay flat position to form a bed, and the secondary seat 122 in the first position for use as an ottoman. In this configuration, a seat bottom 134, a backrest 136, and a leg rest 138 of the primary seat 118 are positioned substantially coplanar to form a bed, and the leg rest meets and aligns with the seat bottom 130 of the secondary seat 122 to provide a longer bed length.

Figure 4A:
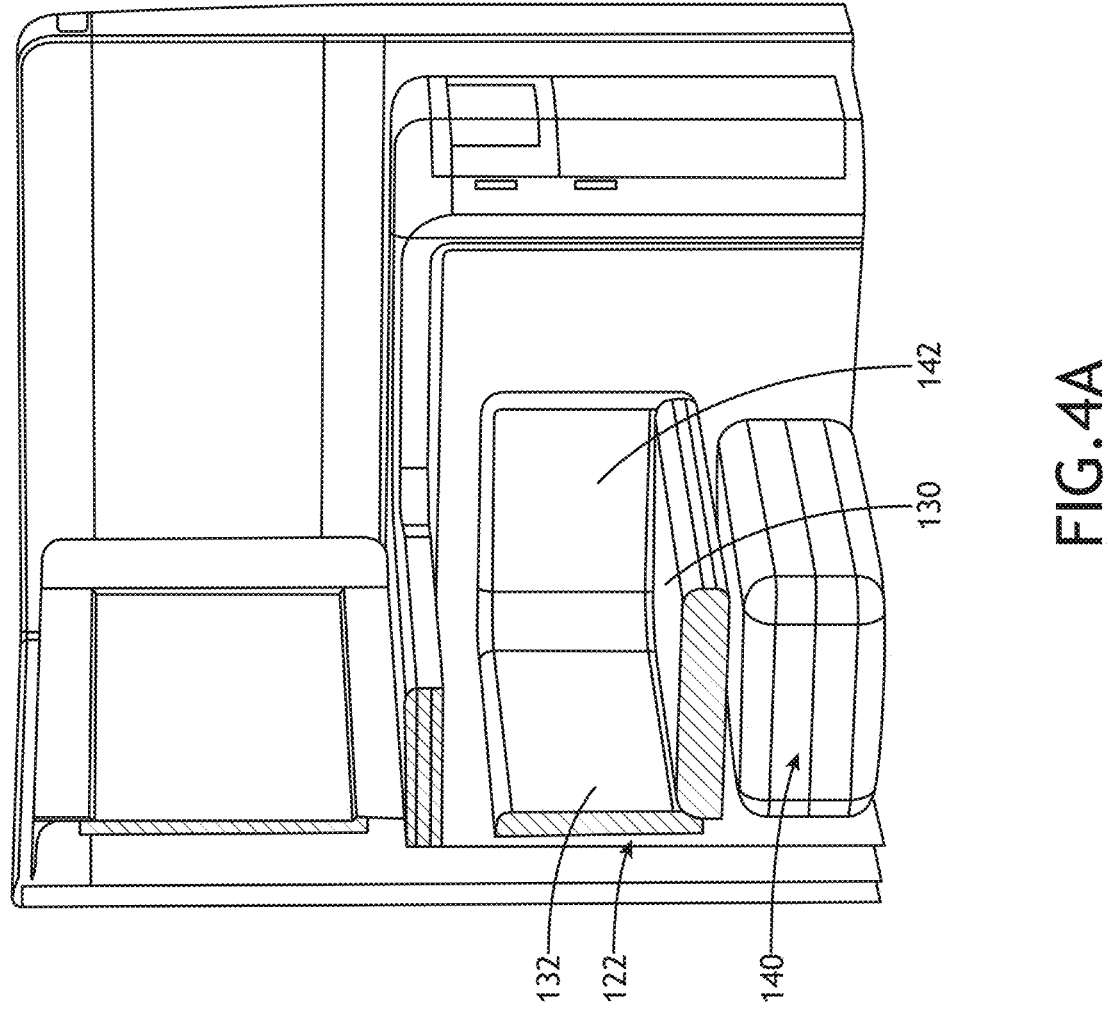
FIG. 4A is a side perspective view of a portion of the passenger suite showing the secondary seat in the first position and elevated above the floor to provide under seat storage space, in accordance with example embodiments of this disclosure.
Figure 4B:
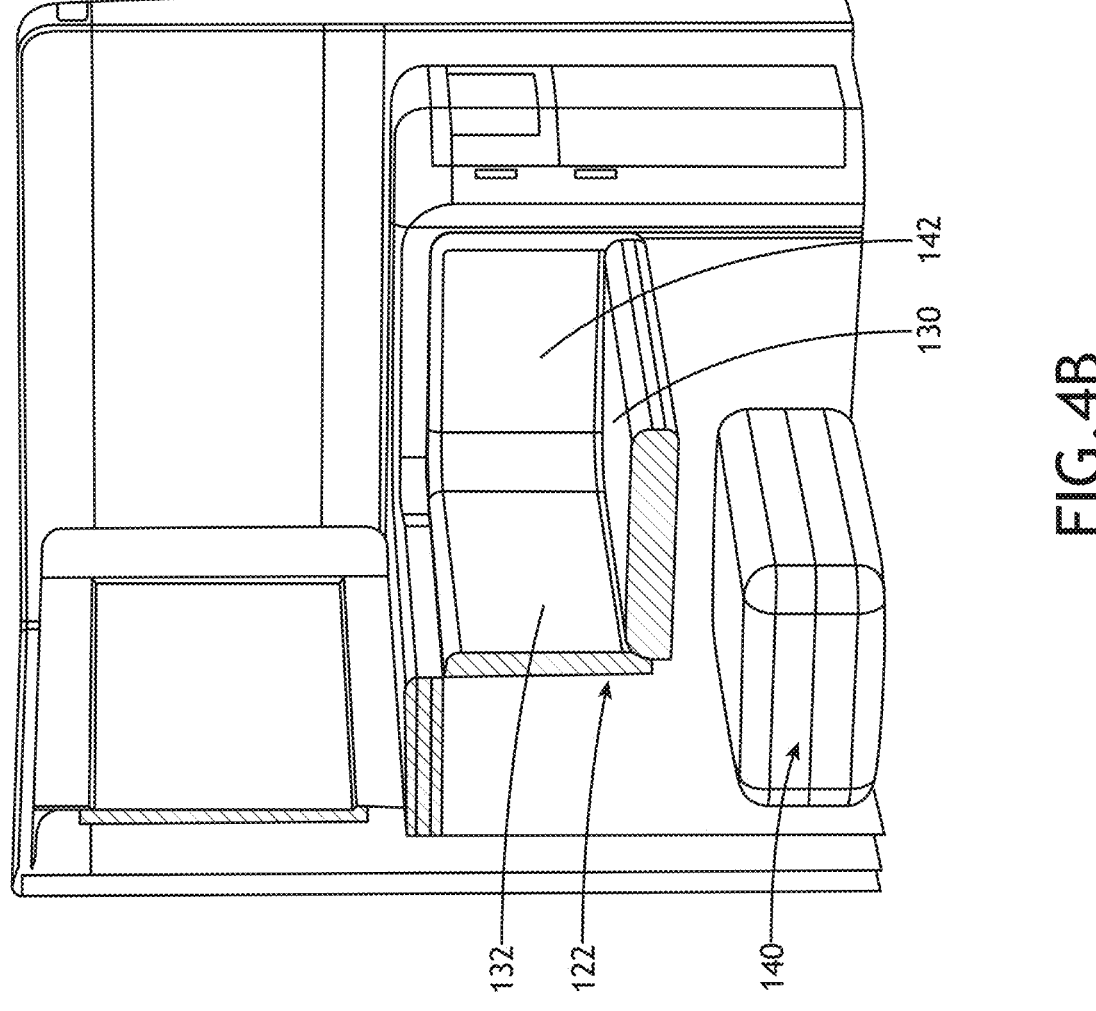
FIG. 4B is a side perspective view of a portion of the passenger suite showing the secondary seat in the second position and elevated above the floor to provide under seat storage space, in accordance with example embodiments of this disclosure.

FIGS. 4A and 4B illustrate the respective first and second positions of the secondary seat 122 elevated above the floor to provide under seat storage space 140. For example, the storage space 140 may be dimensioned to accommodate a traditional carryon bag such as a roller bag. Also shown, the secondary seat 122 may include an upstanding lateral seat portion 142 positioned alongside the secondary console 124. In some embodiments, the seat back 132 and the upstanding lateral seat portion 142 may be integrally formed. In some embodiments, each of the seat bottom 130, seat back 132 and upstanding lateral seat portion 142 may be integrally formed.

Figure 5A:
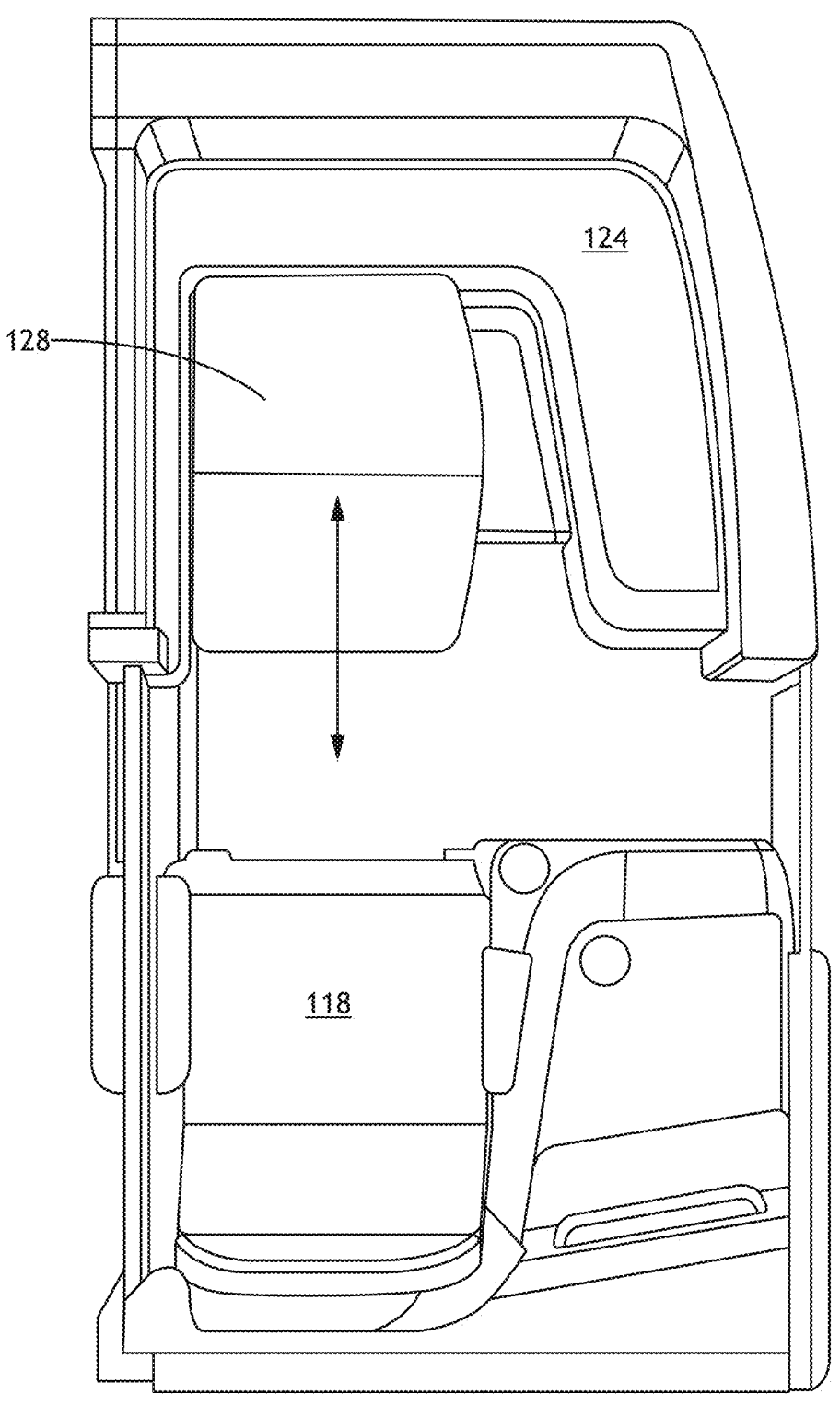
FIG. 5A is an overhead view of the passenger suite showing a first position of a deployed meal table for primary seat egress, in accordance with example embodiments of this disclosure.
Figure 5B:
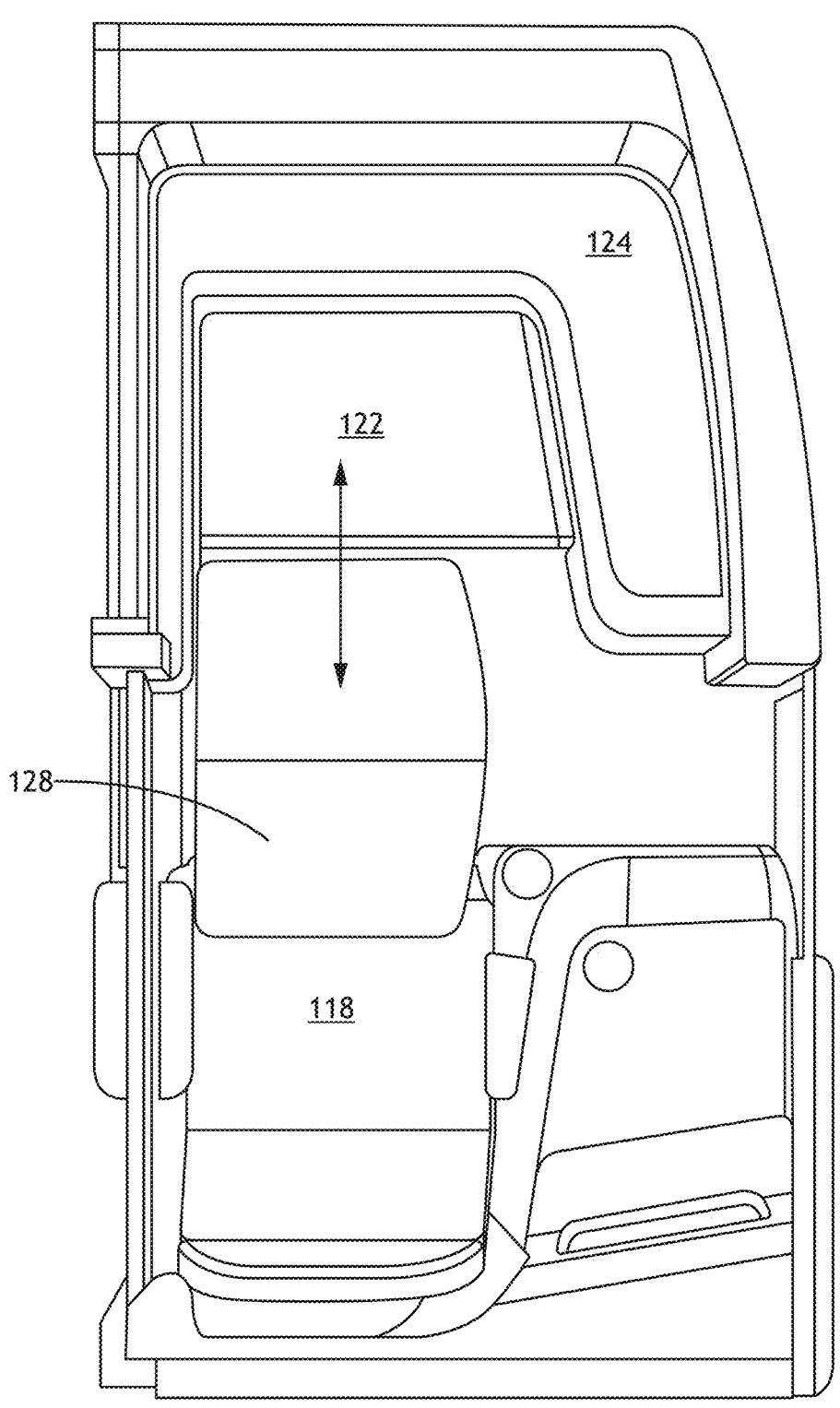
FIG. 5B is an overhead view of the passenger suite showing a second position of the deployed meal table for primary seat use, in accordance with example embodiments of this disclosure.

FIGS. 5A and 5B illustrate different deployed positions of the meal table 128. As mentioned above, the meal table 128 stows within the secondary console 124 and deploys to a position outside of the secondary console 124. In some embodiments, the meal table has a bi-fold configuration to facilitate compact stowing and a larger tabletop when deployed and unfolded. As shown, the meal table 128 is deployable to a first position over the secondary seat 122. In some embodiments, the first position may correspond to an egress position for the primary passenger. For example, when the meal table 128 is in use, the meal table may be moved apart from the primary seat 118 to facilitate seat egress without having to remove the items on the meal table 128. In some embodiments, the second position may correspond to use position for at least one of the primary passenger and a visiting passenger. When in the second position, the meal table 128 is positioned over a portion of the primary seat 118 and substantially positioned for use by each of the primary seat 118 and the second seat 122. For example, when in the second position, the meal table 128 may be used for card playing among other activities. In use, the meal table 128 may be slidable along a rail and thus positionable in the first position, the second position, and any intermediate positions.

Figure 6A:
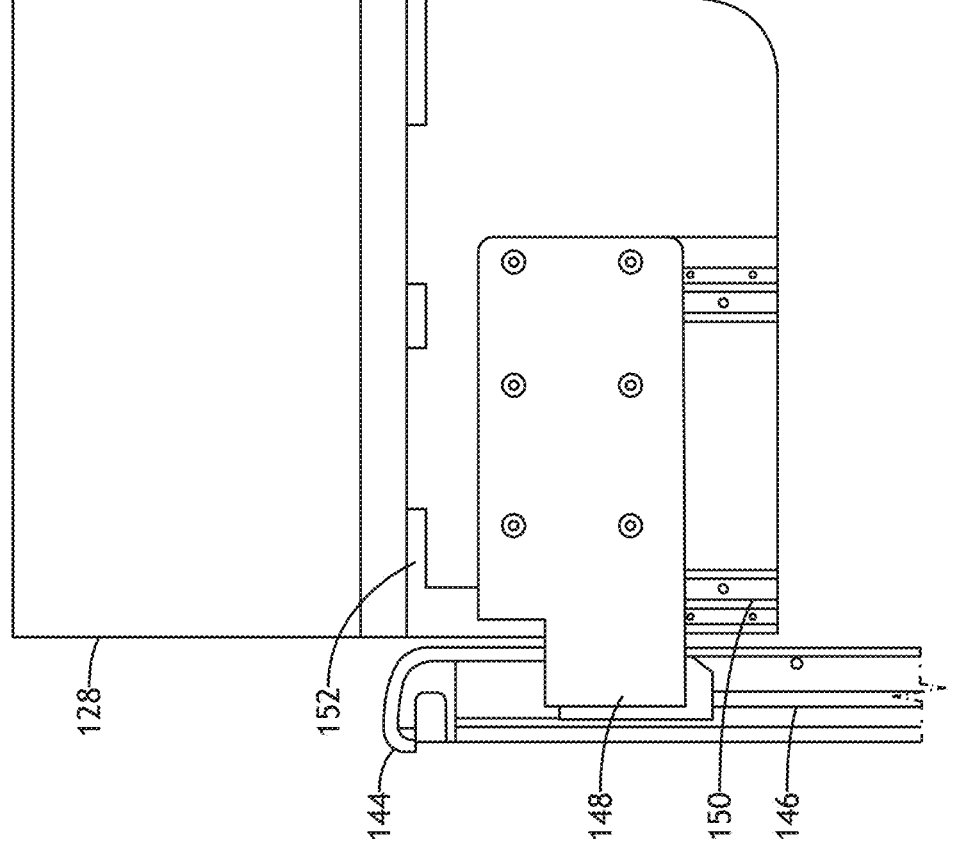
FIG. 6A is a bottom view of a meal table motion assembly mounted to an armrest, in accordance with example embodiments of this disclosure.
Figure 6B:
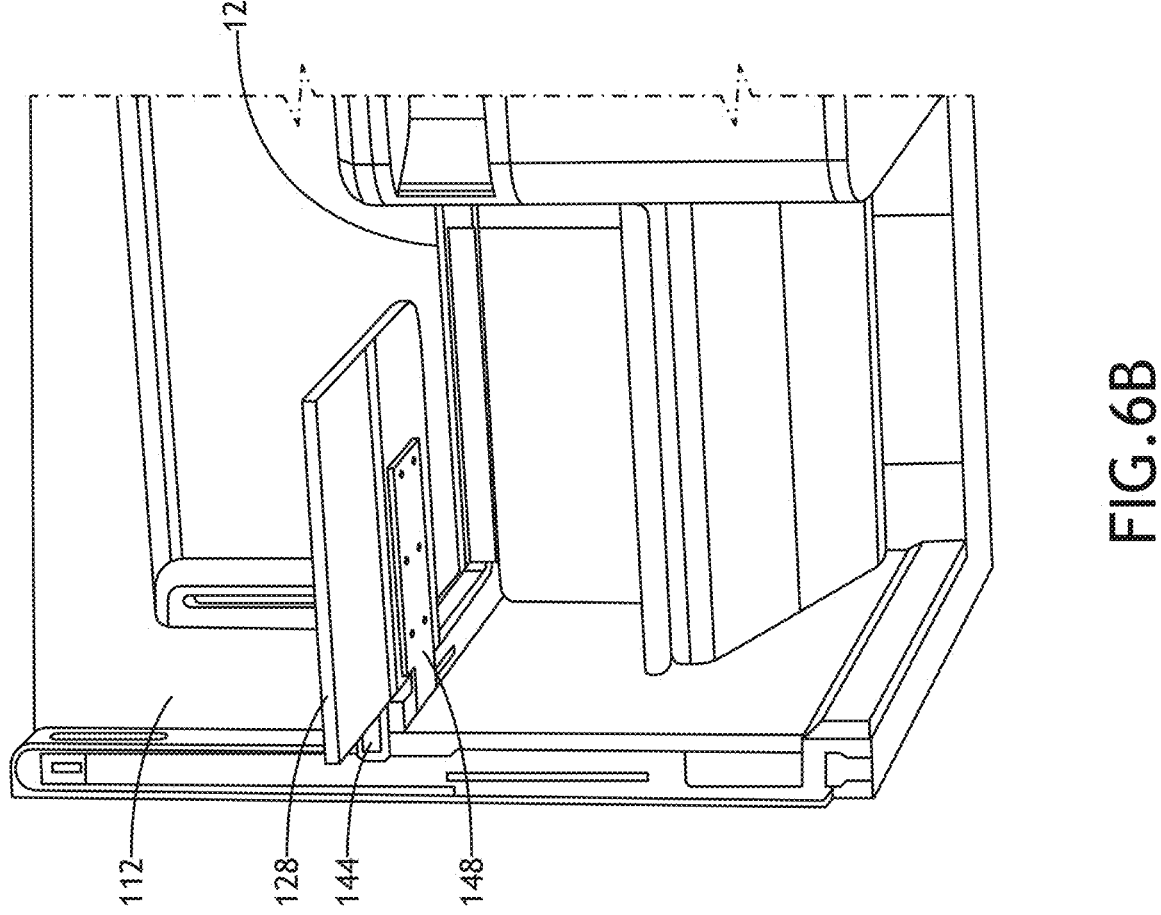
FIG. 6B is a bottom perspective view of the armrest and the meal table motion assembly, in accordance with example embodiments of this disclosure.

FIGS. 6A and 6B illustrate a motion mechanism associated with the meal table 128. In embodiments, an armrest 144 may be mounted to a wall of the passenger suite, for instance the first side wall 112 in a position for use by the secondary seat when positioned in the second position for use as a passenger seat. A deployment rail system 146 may be mounted to the underside of the armrest 144, and the meal table may be mounted on a support arm 148 slidably mounted to the rail system 146. In some embodiments, the meal table 128 may be slidably mounted to fore/aft rails 150 slidably mounted to the support arm 148 for further fore-aft adjustment. In some embodiments, the meal table 128 is a bi-fold table including first and second table portion pivotally coupled through one or more bi-fold hinges 152. In use, the meal table 128 may be deployed along the deployment rail system 146 to a position outside of the second console 124, then unfolded, and then fore/aft adjusted to a desired position. Stowing may be achieved by the reverse sequence.

Figure 7A:
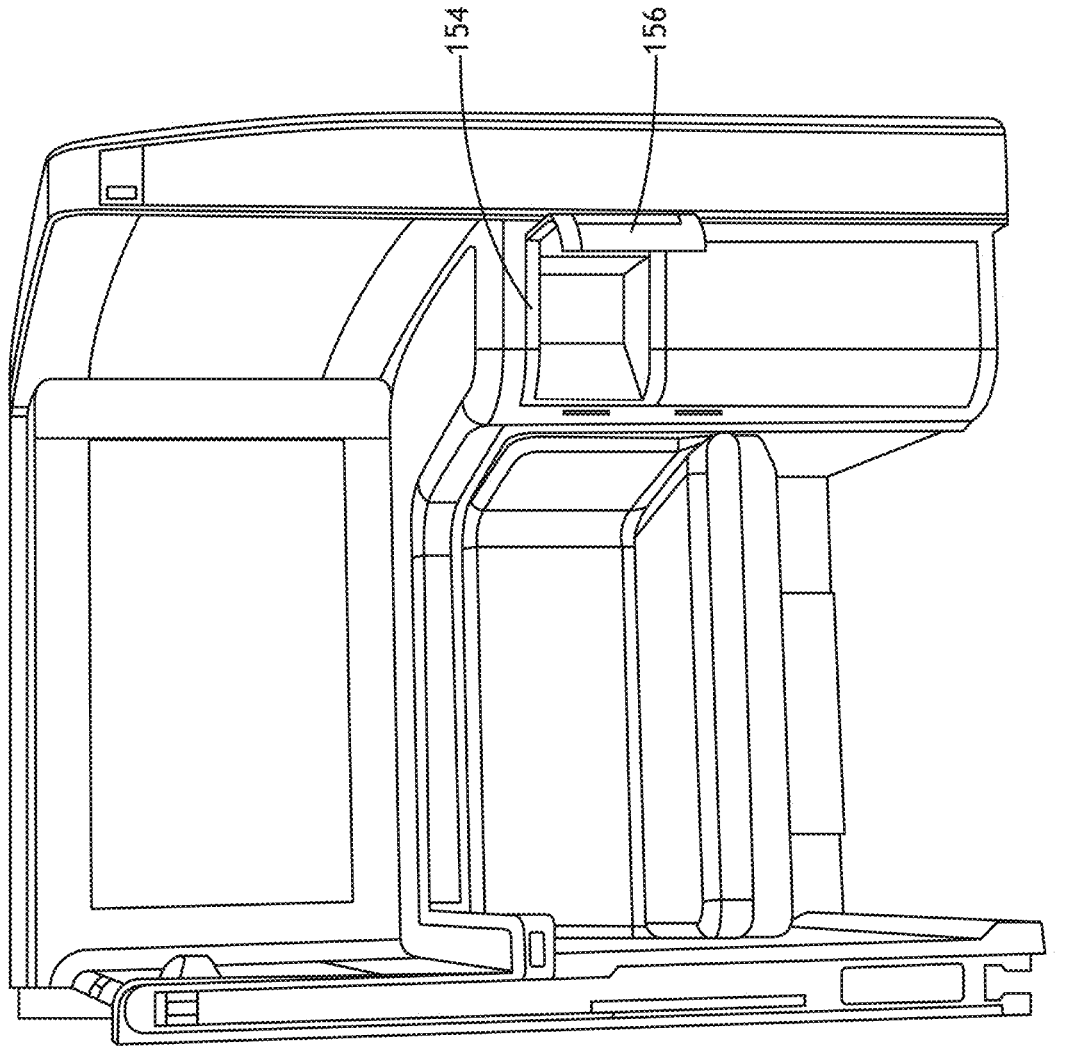
FIG. 7A is a perspective view of a console mounted refrigerator shown with an open door, in accordance with example embodiments of this disclosure.
Figure 7B:
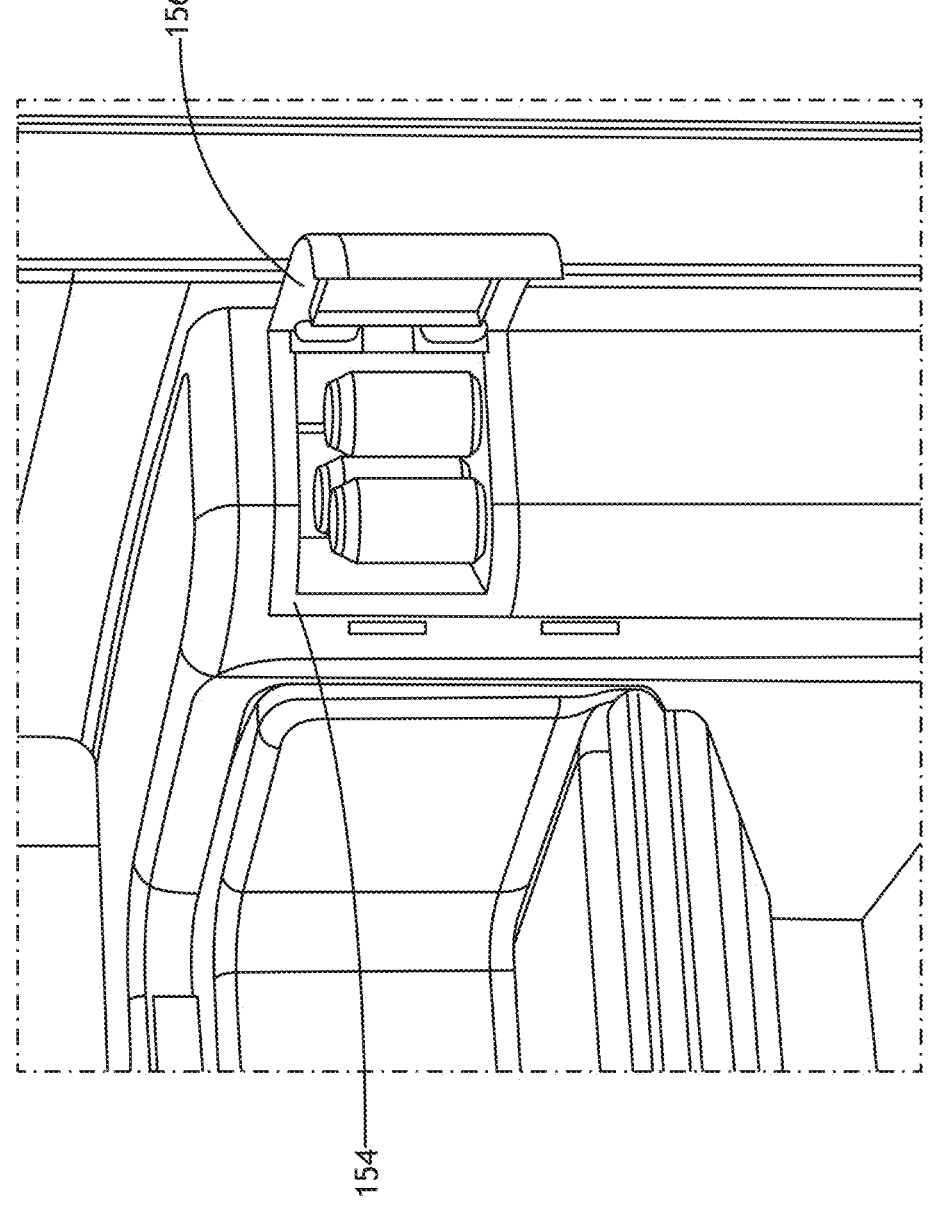
FIG. 7B is a close-up perspective view of the console mounted refrigerator shown with three beverage cans to illustrate refrigerator capacity, in accordance with example embodiments of this disclosure.

FIGS. 7A and 7B illustrate a refrigerator or chiller 154 for inclusion in the passenger suite. As shown, the refrigerator 154 is mounted in the secondary console 124 near the entrance for access by the primary passenger, secondary passenger, or both. In embodiments, the refrigerator 154 includes an interior compartment and a swinging door 156 that opens toward the entrance. As shown, the interior compartment is dimensioned to hold a plurality of beverages, for instance conventional sized aluminum cans, water bottles, single serving alcoholic beverage containers, etc. The passenger suite may be further equipped with additional amenities for entertaining a visiting passenger.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A passenger suite for business class in an aircraft, comprising:
   a front wall, a back wall, a first side wall, and a second side wall defining an interior space;
      a primary seat positioned in the interior space against the back wall, facing the front wall, and alongside the first side wall;
      a secondary seat positioned in the interior space against the front wall, alongside the first side wall, and facing the primary seat, the secondary seat including a first support portion and a second support portion, and the secondary seat movable between a first position against the front wall and a second position apart from the front wall;
      a primary console positioned in the interior space for use with the primary seat, the primary console positioned against the back wall, alongside the primary seat, and alongside the second side wall;
      a secondary console positioned in the interior space for use with the secondary seat, the secondary console positioned against the front wall and alongside at least part of the second side wall; and
   an entrance positioned in the second side wall between the primary console and the secondary console.

2. The passenger suite according to claim 1, further comprising an entrance positioned in the first side wall and alongside the primary seat.

3. The passenger suite according to claim 1, wherein:
   the first support portion of the secondary seat is a seat bottom;
   the second support portion of the secondary seat is a seat back; and
   the first support portion is elevated above a floor of the suite to provide a storage space under the first support portion.

4. The passenger suite according to claim 1, wherein:
   the primary seat includes a seat bottom, a seat back, and a leg rest;
   the primary seat is adjustable between an upright sitting position and a lay flat sleeping position;
   when the primary seat is in the lay flat sleeping position, a forward end of the leg rest meets a forward end of the first support portion.

5. The passenger suite according to claim 1, wherein:

a lateral portion of the secondary console extends along the front wall;

a portion of the secondary seat is positioned under the lateral portion when the secondary seat is in the first position; and the secondary seat when in the second position deploys to a position out from under the lateral portion.

6. The passenger suite according to claim 1, further comprising a meal table, wherein:

the meal table stows within the secondary console;

the meal table deploys to a position outside of the secondary console;

the meal table is configured to travel along a guide rail; and deployed positions of the meal table include at least a first position over the secondary seat, and a second position over at least a portion of the primary seat.

7. The passenger suite according to claim 6, further comprising an armrest mounted to the first side wall, wherein the guide rail is mounted to an underside of the armrest.

8. The passenger suite according to claim 1, further comprising a refrigerator mounted in the secondary console, wherein the refrigerator includes a swinging door that opens toward the second side wall.

9. A front row passenger suite, comprising:

a front wall, a back wall, a first side wall, and a second side wall defining an interior space;

a primary seat positioned in the interior space;

a secondary seat positioned forward of the primary seat, the secondary seat movable between a first position in which the secondary seat functions as an ottoman for use with the first seat, and a second position in which the secondary seat functions as a seat for a visiting passenger, the first position against the front wall and a second position apart from the front wall;

a primary console positioned in the interior space for use with the primary seat, the primary console positioned between the primary seat and the second side wall;

a secondary console positioned in the interior space for use with the secondary seat when the secondary seat is in the second position, the secondary console positioned along the front wall and extending along part of the second side wall; and an entrance formed along the second side wall, the entrance positioned between the primary console and the secondary console.

10. The front row passenger suite according to claim 9, wherein:

when the secondary seat is in the first position at least a portion of the secondary seat is positioned under the secondary console; and when the secondary seat is in the second position, none of the secondary seat is positioned under the secondary console.

11. The front row passenger suite according to claim 9, wherein the secondary seat includes a seat bottom, a backrest, and an upstanding lateral portion continuous with the backrest.

12. The front row passenger suite according to claim 9, wherein the primary seat is adjustable between a sitting position and a lay flat sleeping position, and wherein, when the primary seat is in the lay flat sleeping position, a legrest of the primary seat meets the secondary seat when the secondary seat is in the first position.

13. The front row passenger suite according to claim 9, further comprising a video monitor positioned above the secondary console.

14. The front row passenger suite according to claim 9, wherein the interior space tapers in a direction of the forward end of the front row passenger suite.

\* \* \* \* \*